March 9, 1965   S. WARSHAW ETAL   3,172,779
APPARATUS FOR MEASURING THE AMOUNT OF COATING
APPLIED TO A SUBSTRATE
Filed June 30, 1961   3 Sheets-Sheet 1

United States Patent Office 3,172,779
Patented Mar. 9, 1965

3,172,779
APPARATUS FOR MEASURING THE AMOUNT OF COATING APPLIED TO A SUBSTRATE
Saul Warshaw, New York, N.Y., and Winton S. Loveland, Bloomfield, Conn., assignors to Atlantic Gummed Paper Corporation, Brooklyn, N.Y., a corporation of New York
Filed June 30, 1961, Ser. No. 121,064
9 Claims. (Cl. 118—9)

The present invention is concerned with the measurement of the quantity of coating applied to a substrate particularly a substrate or strip of continuous form.

It is important for various reasons to be able to measure the amount of the surface layer being applied to an advancing strip of material fed through a coating machine. There is an optimum thickness or amount from the standpoint of economy and physical properties of the final product, and it is commonly desirable to reproduce accurately conditions and products previously established.

Various expedients have heretofore been resorted to for controlling or determining the amount of the coating. Among these have been systems which depended upon the height or weight of liquid in the coating reservoir or the amount of overflow therefrom. Still other systems have employed electrical means such as photoelectric cells which responded to the amount of light penetrating the sheet, or which measured the thickness as a function of the electrical resistance. Still other systems have been based upon the amount of beta rays which penetrate the sheet and impinge upon a sensitive element activated thereby to transmit signals proportional to the intensity of the ray to an indicator. Such prior systems may be characterized as indirect measuring means and they are subject to many variable conditions in the physical nature of the substrate which prevented the recorded value from being a precise or accurate measurement of the thickness of the coating per se. Many of these systems were particularly inadequate in the case of coating web materials of irregular surface such as in applying a sizing to fabric or applying adhesive to a corrugated sheet. In the latter case it is common to apply an adhesive directly to the corrugated layer, the adhesive, however, being deposited only on the tops of the ridges. In such case the responses in devices employing electronic beams are necessarily subject to considerable inaccuracies.

The system of the present invention is based on direct quantity measurement of the two major factors comprising the amount of liquid applied and the area coated. One of these factors is predetermined and the other is automatically measured and recorded. The system is marked by exceptional accuracy. It embodies features of automatic control whereby a test cycle of measurement may be run almost any time without disturbance of the continuous coating operation.

In accordance with the general principles of the invention and one embodiment thereof a recording meter is pre-set for any desired test area and the amount of liquid applied over such area is recorded on a liquid flow meter. If desired the flow meter may be graduated to register directly in terms of thickness and the recording meter may include ticket printing or punching means. In the automatic operation the operator merely presses a control button, for example, which concurrently starts the area recorder in operation and the recording device of the liquid meter. When the pre-set area is attained the measuring cycle is automatically terminated including the operation of the liquid meter recorder and the reading on the latter is then taken or noted. Or a signal can be generated which may feed back to the coating device in order automatically to adjust within predetermined limits the amount of coating applied to the material.

In accordance with another embodiment disclosed herein the system is similar to the above described embodiment but is so arranged and adapted that one recording meter is pre-set for a certain selected standard quantity of liquid, and the area of the substrate coated by such quantity is recorded on another instrument.

The system embodies further features and advantages which will be made more apparent by consideration of a representative embodiment of the principles of the invention. The invention accordingly comprises the combination of elements and their relation to each other and manner of functioning which will be exemplified in the system disclosed in the accompanying drawings and hereinafter described. Accordingly reference should be had in connection with the description to the drawings in which.

Figures 1, 2:
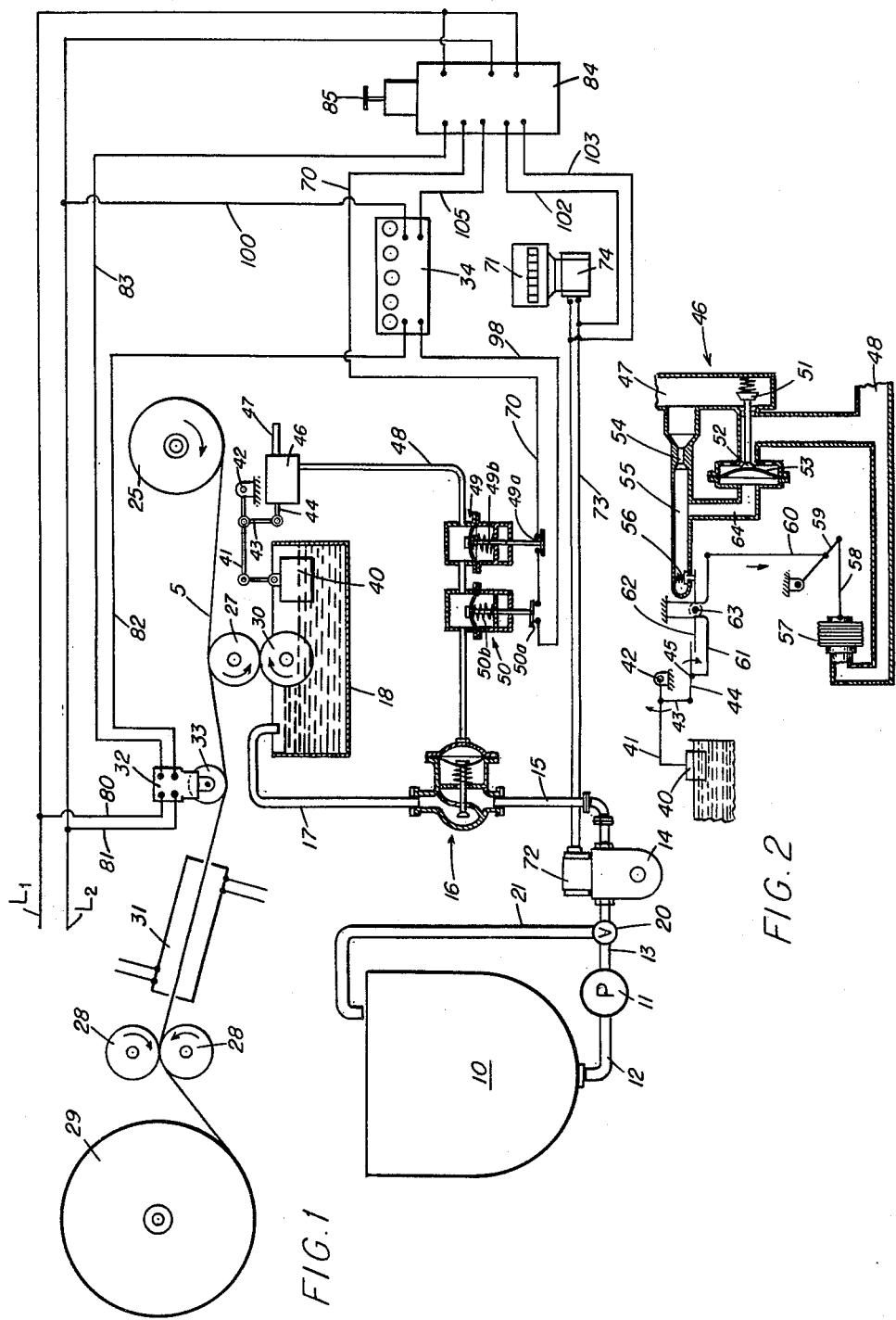
FIG. 1 is a view of a complete system in largely diagrammatic form but showing the various elements or devices thereof and their relation to each other.
FIG. 2 is a view also largely diagrammatic showing the parts and arrangement of a control unit operated from the liquid float member.

FIG. 1 shows a system exemplifying the principles of the invention. The novelty resides principally in a combination of elements or units each of which may be obtained commercially and which may vary as to detail depending upon the particular source. Likewise the materials treated may vary considerably dependent upon the ultimate product sought. Accordingly FIG. 1 is to a large extent diagrammatic.

It embodies a source of the coating material depicted as a tank 10 from which liquid is drawn by a suitable pump 11 through pipe 12 and delivered through pipe 13 to a flow meter 14 and from there through pipe 15, control valve 16 and pipe 17 to coating tank 18.

Inserted in the line between the pump and the flow meter is a pressure relief valve indicated generally at 20 to which is connected the relief line 21 adapted to discharge into the top of the tank 10.

The flow meter 14 is a standard type meter for measuring the flow of liquids and may vary accordingly as to details. A commercially available meter which has been used for the purpose is known under the name "Xacto Meter Model 460," sold by Bowser, Inc., Fort Wayne, Indiana.

The apparatus is designed for the coating of any type of material in continuous form such material being commonly referred to as the substrate or strip. Dependent upon circumstances the material may be in continuous web form of various kinds or composed of one or more continuous strands. Accordingly when used herein the terms "strip" or "substrate" mean a material which may be of linearly continuous character of a flexible nature whether in web or strand form. Likewise the coating material will vary dependent upon the substate and the ultimate desired product. Also the means for applying the coating material to the substrate may vary in type and structure in considerable detail including the means for feeding the substrate. FIG. 1 shows the strip S, which may be a paper, as being drawn from a supply roll 25 mounted in a suitable manner from which the strip S proceeds over an applicator roll 27 continuing through a pair of pinch rolls 28 and is taken up on a rewind roll indicated at 29. The rolls 28 and 29 may be driven in any conventional manner well known in the art. The particular form of coating device embodied in the system shown in FIG. 1 includes a doctor or pick-up roll 30 which delivers the coating material to the applicator roll 27 over which travels the strip S. If the coating material is an adhesive or other material requiring drying a suitable drying oven 31 may be included in the line.

Intermediate of the coating roll 27 and the drive rolls 28 is located a suitable linear counter means of which various types are available commercially. In the present system the particular form employed indicated at 32 is of the type having a roller or disc 33 which engages and is rotated by the traveling strip S and through a photoelectric eye sends electrical impulses to a recorder. The details of such well known devices form no part of the present invention and are omitted. It is sufficient to note that once every revolution the disc produces or interrupts a light beam of a photoelectric eye sending an impulse through electric circuitry to a recorder indicated at 34. Further details of the electrical circuit will be described in connection with the diagram of FIG. 3.

The system embodies means for maintaining a predetermined level of liquid in the tank 18. Various types of means may be employed for such purpose such as gravimetric devices coupled with a modulating flow valve, sonic waves emanating from a fathometer controlling a modulating flow valve or a simple float means. The particular form of means illustrated in FIGS. 1 and 2 includes a float 40 pivoted to the end of a lever 41 which in turn is pivoted in a fixed bearing at 42. Connected to lever 41 at an intermediate point is a link 43 which at its lower end is pivotally connected to a further lever 44 pivoted as shown in FIG. 2 on a floating bearing 45 within a housing or unit 46. The unit 46 in general is adapted to control the flow of air under pressure from a source indicated at 47 to a line 48 which in turn effects control of the valve 16 and two intervening pressure responsive switch devices 49 and 50. The switch devices will be described more fully shortly.

Reference will now be made to FIG. 2 for the details of the control unit 46 which shows somewhat diagrammatically the elements and functioning of the control unit including the float 40 and its connections into the unit. The unit includes a double valve member having at one end the valve 51 and at the other end valve 52, the valves being under the control of bellows 53. Valve 51 controls the admission of air to the line 48 and valve 52 controls the escape of air to the atmosphere. The supply line 47 is also connected through an orifice or constriction 54 to a chamber 55 in which is mounted a relief valve 56. Valve 56, in addition to being influenced by the position of the float 40, is influenced by the pressure in the line 48 through the medium of a bellows or other pressure responsive device 57. The interior of bellows 57 is in communication with line 48, and the bellows is mechanically connected through a link 58, pivoted lever 59 and link 60 to lever 61 which at one end carries the pivot support 45 for the lever 44. The valve 56 is mounted on an intermediate lever 62, the levers 61 and 62 both having a common fixed pivot support 63.

In the operation of the control unit 46 upward movement of the float 40 serves to rock the lever 44 clockwise and the right end of lever 44 engages and rocks lever 62 counter clockwise which moves valve 56 upwardly from its seat permitting the escape of air to the atmosphere and a drop of pressure in the line 64 which communicates with the interior of the bellows 53 causes it to collapse proportionately moving valve elements 51, 52 to the left. This causes valve 51 to close or reduce the opening therethrough to the line 48 and simultaneously allows air to escape from line 48 to the atmosphere at the valve 52. The interior of bellows 57 is connected to the line 48 and drop of pressure therein causes the bellows 57 to collapse which, through the linkage 58, 59, 60, 61 elevates the pivot point 45 and lever 44 relieving the pivoted lever 62 and permitting the valve 56 to move fully or in part as the case may be toward its seat. In net result the position of the float 40 therefore controls the pressure in the line 48. Although other types of control unit may be used in place of the one indicated at 46, and disclosed in detail in FIG. 2, the present type is particularly advantageous because of its extreme sensitivity and accuracy. The pressure in line 48 controls of course the position of the valve mounted in the casing 16 and accordingly controls the feed of liquid to the coating tank 18 whereby a desired constant level of liquid is maintained therein.

The functioning of the pressure responsive switch units 49 and 50 will be described more fully in connection with the wiring diagram, but for the present it is pointed out that too high pressure in the line 48 opens a switch 49a and too low a pressure opens a switch 50a. In other words the electric circuit through the control line 70 is broken whenever the level of the liquid at the float 40 is outside a certain range, that is either below a certain height or above a certain height.

Further elements shown diagrammatically in FIG. 1 include a means for registering on the recorder 71 the amount of liquid delivered through line 15 to the supply tank 18 during a predetermined test period or cycle. Conveniently this may be effected through a Selsyn generator and motor system and FIG. 1 shows diagrammatically a Selsyn generator 72 operated by the volume meter 14 connected through a cable 73 to Selsyn motor 74 connected to operate mechanism in the indicating recorder 71.

Various other element may be noted generally in the system of FIG. 1 including the main electrical supply lines $L_1$ and $L_2$ connected through branch lines 80 and 81 with the counter pick-up unit 32 and through the line 82 with the recording instrument 34, and through line 83 with the electrical relay switch unit 84 under the control of manual switch button 85. Further details will be described in connection with the circuit diagram of FIG. 3.

Figure 3:
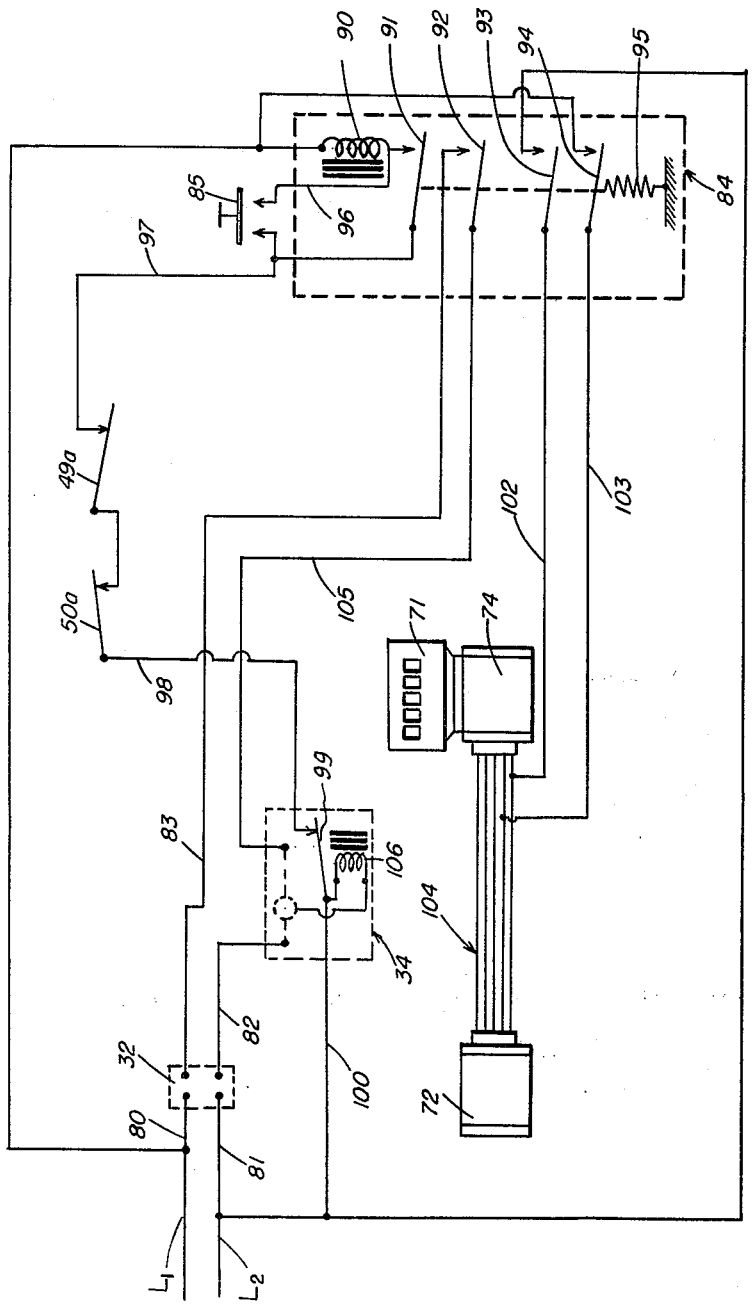
FIG. 3 shows the electric circuitry for the system of FIG. 1.

Referring to FIG. 3 the circuit includes within the relay unit 84 a solenoid 90 adapted to control the switches 91, 92, 93 and 94 which are normally biased to open position by suitable means such as indicated by the spring 95.

The solenoid 90 is initially energized through depression of the button 85 the circuit in that case being from line $L_1$ through the solenoid 90, lines 96 and 70, switches 49a, 50a, line 98, switch 99 within the recorder 34, and line 100 and back to the other side $L_2$ of the main line. This occurs of course only when the switches 49a, 50a and 99 are closed. In such case coil 90 is energized closing the switches 91 to 94 inclusive. Switches 93 and 94 control the operation of the Selsyn generator-motor unit by controlling the connections of lines 102 and 103 with the main lines $L_2$ and $L_1$ respectively. In other words the operation of the fluid meter 14 which drives the Selsyn generator 72 is effective to register on and operate Selsyn motor 74 only when the switches 93 and 94 are closed. The Selsyn generator-motor system comprises a standard system commercially availabe such as sold by General Electric Co. and it is believed unnecessary to encumber the present disclosure with the details thereof. As indicated in FIG. 3 it includes a number of wire connections 104 with appropriate connections thereinto from the main line through lines 102 and 103 just described.

The recorder unit 34 is likewise a standard instrument commercially available and is adapted to be preset for a desired value and upon the recording system being energized through depression of the button 85 it will be operated continuously from the counter 32 through electrical circuit line 83, switch 92, line 105, through instrument 34 and back to counter 32 through line 82. This continues until the preset-value is reached whereupon it is automatically tripped to terminate the recording as by automatic means indicated more or less diagrammatically as the switch 99 in FIG. 3, which at the termination of a preset cycle is opened automatically by suitable means such as through energization of solenoid 106. A standard commercial recorder may be employed for the purpose. A suitable device of the kind referred to is available from Veeder-Root Inc. of Hartford, Connecticut, under the commercial name of "New Count-Pack Series 1604." The details thereof form no part of the system depicted in the drawings and it will be sufficient to note that the instrument may be manually pre-set at any desired value or total within its range and when that value is reached through impulses received from the counter unit 32 the electrical circuit through switch 99 is broken through a suitable trip device such as a cam or the solenoid device indicated at 106. This de-energizes solenoid 90 opening switches 91 to 94. Liquid flow meter 14 continues to operate but because switches 93 and 94 are open the drive through the Selsyn generator-motor system ceases and correspondingly recording on meter 71 ceases.

As heretofore mentioned, in the present case the system is designed to measure and record the amount of coating material applied to a predetermined area of substrate comprising a continuous strip of material. As a specific example illustrative of the uses and operation of the system it will be assumed that it is desired to record the amount of glue applied to a strip of backing material which may be ordinary kraft paper. In such an operation the indicator 34 is set for certain value which may for example be a standard unit of area such as a ream comprising 3000 sq. ft. The instrument 34 of course registers in units representative of length, but knowing the width of strip S a setting corresponding to the desired square area can readily be determined. The instrument 34 having been set and switch 99 being closed, the operator depresses momentarily the button 85. This closes the switches in relay box 84 through the functioning of solenoid 90. Closing of switch 92 completes the circuit from the counter unit 32 to recorder 34 through lines 83, switch 92 and line 105 and starts the recorder operating. Closing of switches 93 and 94 energizes the Selsyn generator-motor system and the amount of liquid which moves through meter 14 will be recorded on meter 71. The recording will be continuous and accumulative until the setting on instrument 34 has been reached and switch 99 is opened breaking the circuit to solenoid coil 90 and opening the various relay switches. The reading on meter 71 comprises the amount of liquid which has been applied to the selected unit of area. It is necessarily accurate to a very close degree. If the reading is too high or too low, adjustment is made by any of the various known methods such as changing the distance between the rolls 27 and 30 or modifying the viscosity of the liquid. As heretofore mentioned the meter 71 may be of standard known type and in accordance with features commonly embodied therein it may also perform such operations as giving a signal and issuing a ticket with the reading thereon. Although the recording on meter 71 is based on and proportional to the volume it may be graduated in terms of any desired units such as thickness or weight of the coating, given that the solids content of the coating material are both known and constant.

The system includes features which particularly enhance the accuracy and reliability of the recording systems, by ensuring that a measuring cycle is not instituted or does not become effective unless and until the liquid coating conditions have become stable. For example when starting a coating operation either for a new supply roll or after an interruption it commonly requires a period of time for the liquid at each side of doctor roll 30 to reach levels respectively at which conditions become stabilized. Angular acceleration of the coating rolls may change the level of the coating material and until the level is stabilized the reading is subject to error, since a non-measured amount may be applied to the substrate. Accurate level control is necessary in order that the flow meter reading be significant. The above is illustrative of various conditions which may cause temporary erratic movement or positioning of float 40 and also of abnormal or non-uniform liquid coating conditions. With the present system, depression of the button 85 does not illustrate a test run until float 40 has assumed a stable position corresponding to the desired level and coating conditions. This results from the functioning of the pressure responsive devices 49 and 50 which control electric switches 49a and 50a respectively. As indicated in FIGS. 1 and 3 switch 49a is normally biased to closed position by spring 49b. If the pressure in pipe 48 is above a certain value as a result of the position of float 40 the switch 49a will be opened. On the other hand switch 50a is normally biased to open position by spring 50b and is closed when the pressure in pipe 48 reaches a certain minimum value. Consequently depressing of button 85 does not energize the relay switches and does not institute the recording operations on instruments 34 and 71 unless and until the liquid coating conditions are normal and standard. The operator may either hold down button 85 for a sufficient period of time for conditions to become stabilized, or wait and again press the button later. Likewise if during a test run an abnormal condition develops one of the switches 49a or 50a will be opened interrupting the recording operations and the results may of course be discarded.

Figure 4:
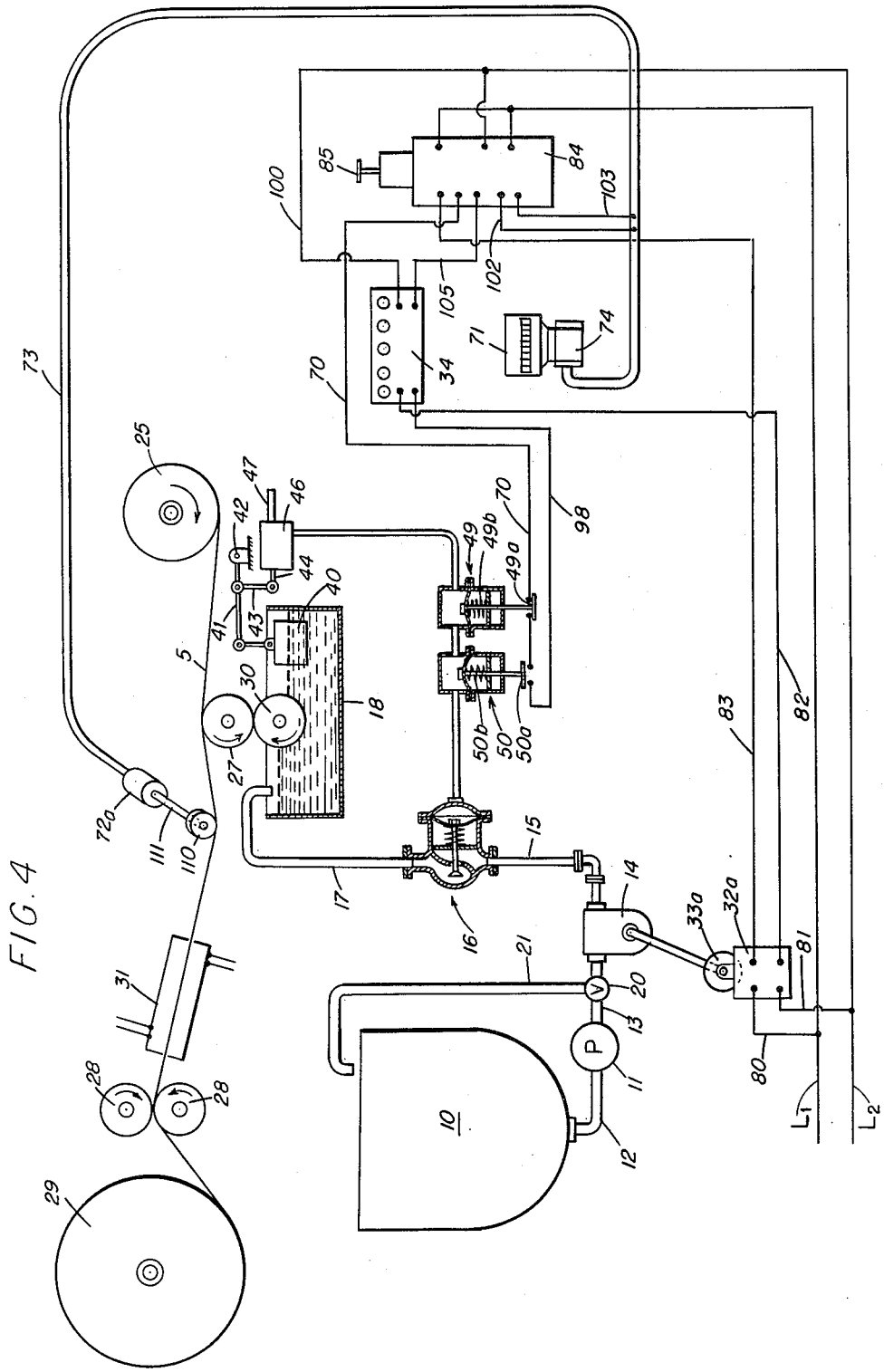
FIG. 4 is a view generally similar to FIG. 1 showing a complete system but modified from that of FIG. 1 in certain respects.

In the form shown in FIG. 4 the system is modified to the extent that the control unit 34 is connected into the system to be responsive to and register the amount of liquid delivered to the coating apparatus and to terminate the recording operations when a given amount has been delivered corresponding to the pre-set value on the instrument 34. Correspondingly meter 71 is connected to record the length of strip and thereby the area fed through the coating apparatus during the consumption of the pre-set amonut of coating material.

This modification or variation is effected by having a strip contacting wheel 110 connected to drive the Selsyn generator 72a through a suitable means indicated diagrammatically as a shaft 111; and having the flow meter 14 connected to drive a roller or disc 33a associated with the linear counter means 32a, the unit 32a, 33a being like the unit 32, 33 of FIG. 1. The electrical control circuitry may be the same as shown in FIG. 3, the Selsyn generator 72a corresponding to the generator 72, and the photoelectric element 32a corresponding to the element 32 in FIG. 3.

Accordingly for a test run the instrument 34 is pre-set at a selected value corresponding to a standard quantity of the coating material. The cycle is instituted by depressing the button as heretofore described and operation ensues with the strip feed being recorded on meter 74. When the pre-set quantity of coating material has been fed through flow meter 14 the circuit is broken by the instrument 34 which stops the operation of Selsyn motor 74 driving the recorder 71 which in this case registers the area of substrate coated by the selected quantity of liquid.

It should be understood that further or different embodiments of the invention could be employed and various changes made without departing from the scope thereof, and it is intended that all matter contained in the above description or shown in the accompanying drawing shall be interpreted as illustrative and not in a limiting sense.

We claim:

1. In an apparatus for applying a coating in liquid form to an advancing strip of material having means for advancing the strip, liquid coating means in the path of the strip, and means including a conduit for supplying the liquid to said coating means, a system for determining the amount of liquid applied per unit of area of the strip comprising, a first means for automatically recording the amount of said strip advancing through said coating means, a second means connected into said liquid conduit for automatically recording the amount of liquid supplied to said coating means, control means for instituting a measuring cycle by starting the recording on said first and second recording means, and means effective to terminate the recording on one of said recording means when a predetermined amount has been attained on the other recording means.

2. In an apparatus for applying a coating in liquid form to an advancing strip of material having means for feeding the strip, liquid coating means in the path of the strip, and means including a conduit for supplying the liquid to said coating means, a system for selectively measuring the amount of liquid applied per unit of area of the strip comprising, a strip measuring meter operable by the advancing strip adapted to be pre-set selectively to a desired value corresponding to a predetermined area of said strip, said control meter including control trip means operable upon attainment of the pre-set value, a fluid meter in said liquid conduit, a recording device operated from said fluid meter operable in conjunction with said strip measuring meter, said control trip means being effective upon attainment of said pre-set value to terminate automatically the recording on said measuring meter and said recording device upon the completion of feed of said predetermined strip area.

3. In an apparatus for applying a liquid coating to an advancing substrate in continuous form having means for advancing the substrate, a system for selectively measuring the amount of liquid applied to a predetermined area of the substrate, comprising a meter connected to measure the advancing substrate, a recorder means for continuously recording the amount of liquid supplied to the coating apparatus, an electrical control circuit for said meter and recorder, manually operable means associated with said electrical circuit for instituting a measuring cycle, and means associated with said electrical circuit automatically operable to terminate the cycle when a predetermned area has been coated.

4. In an apparatus for applying a liquid coating to an advancing substrate in continuous form having means for advancing the substrate, a system for selectively measuring the amount of coating applied per unit of area of the substrate, comprising a meter connected to measure the advancing substrate, a recorder means for continuously recording the amount of liquid supplied to the coating apparatus, an electrical control circuit for said meter and recorder, manually operable means associated with said electrical circuit for instituting a measuring cycle, and means associated with said electrical circuit automatically operable to terminate the cycle when a predetermined amount of coating has been applied.

5. In an apparatus for applying a coating in liquid form to an advancing strip of material having means for feeding the strip, liquid coating means in the path of the strip, and means including a conduit for supplying the liquid to said coating means, a system for selectively determining the amount of liquid applied per unit of area of the strip comprising, linear meter means for measuring and registering the linear advance of said strip, fluid meter means for measuring and registering the liquid flow through said conduit, and a common control means for said system for effecting automatically a measuring cycle including manual means for rendering operative simultaneously the recording on said linear meter means and said fluid meter means and for terminating the recording on one meter means when a preselected amount is registered on the other meter means.

6. In an apparatus for applying a coating in liquid form to an advancing strip of material having means for feeding the strip, liquid coating means in the path of the strip and means including a liquid conduit for supplying the liquid to said coating means, a system for selectively measuring the amount of liquid applied per unit of area of the strip comprising linear meter means operable to register the linear advance of said strip including means for pre-setting the register for a selected value, a fluid meter means operable to measure and register the liquid flow through said liquid conduit, and a common control means for said system for effecting automatically a measuring cycle including means for instituting the registration of liquid flow, and means for interrupting such registration when said selected value has been attained on the linear meter means.

7. Apparatus for determining the amount of liquid coating applied to an advancing substrate in continuous form comprising linear measuring means operable automatically to measure and record the amount of linear advance of the substrate, liquid meter means operable automatically to measure and record the amount of liquid supplied, and an electrical control circuit means associated with said linear measuring means and said liquid measuring means embodying a starter switch, and relay switch means, said starter switch being connected to energize and operate said relay switch means and institute a measuring cycle, means for setting one of said measuring means for a selected amount, and trip means automatically operated when said selected amount has been attained effective to deenergize said relay switch means and thereby terminate the recording at the other of said measuring means.

8. In an apparatus for applying a liquid coating to an advancing substrate in continuous form embodying means for determining the amount of liquid applied to the substrate, a supply reservoir for the coating material, means for transferring the liquid therefrom to the substrate in its advance, means for supplying liquid to said reservoir, means responsive to the level of liquid in said reservoir connected to control the supply of liquid to said reservoir, registering means operable automatically to register the linear advance of the substrate including means for presetting said registering means for a selected value, liquid meter means for automatically measuring and recording the amount of liquid supplied to said reservoir, an electrical control circuit means associated with said linear registering means and said liquid measuring means, means in said electrical circuit operable to start a measuring cycle, and means in said electrical circuit responsive to the level of liquid in said reservoir for rendering ineffective said starting means when the level of liquid in said reservoir is outside a predetermined range.

9. In an apparatus for applying a liquid coating to an advancing strip of sheet material, a supply reservoir for the coating material, means for transferring the liquid therefrom to the strip in its advance, means for supplying liquid to said reservoir, means for measuring the amount of liquid applied to the strip, an electrical control circuit means for said measuring means, a pressure responsive electrical switch means in said electrical circuit, a source of fluid under pressure connected to said switch means, and a device responsive to the liquid level in said reservoir connected to control the pressure from said source to said pressure responsive switch means and thereby to interrupt the electrical circuit and render said measuring means ineffective when the liquid level in said reservoir is outside a predetermined range.

References Cited by the Examiner
UNITED STATES PATENTS 1,785,370   12/30   Thomas _____ 118—4
2,620,412   12/52   Ford _____ 200—56

RICHARD C. QUEISSER, *Primary Examiner.*

ROBERT EVANS, *Examiner.*